United States Patent [19]
Campbell

[11] Patent Number: 4,939,576
[45] Date of Patent: Jul. 3, 1990

[54] ADAPTIVE RINGING REDUCER FOR TELEVISION SIGNAL PROCESSING

[76] Inventor: Jack J. Campbell, 1161 De Haro St., San Francisco, Calif. 94110

[21] Appl. No.: 384,325

[22] Filed: Jul. 24, 1989

[51] Int. Cl.$^5$ .................. H04N 5/14; H04N 5/208; H04N 5/213
[52] U.S. Cl. .................. 358/166; 358/167; 358/133; 358/156; 364/724.01; 455/313
[58] Field of Search .................. 364/724.01, 724.19; 358/166, 156, 167, 160, 133, 144, 140, 105, 126, 135, 141, 37, 12; 328/166, 167; 455/313, 323, 142, 65; 379/410, 411; 375/43, 94, 101, 10, 88, 98, 76, 82

[56] References Cited
U.S. PATENT DOCUMENTS 3,736,511  5/1973  Gibson .................. 375/76
4,417,269 11/1983  Dischert .................. 358/13
4,631,737 12/1986  Davis et al. .................. 375/76
4,672,444  6/1987  Bergen et al. .................. 358/133

Primary Examiner—Howard W. Britton
Assistant Examiner—Michael Lee
Attorney, Agent, or Firm—David B. Harrison

[57] ABSTRACT

A method for reducing ringing artifacts caused by low pass filtering of baseband television signals comprises the steps of: detecting the occurrence of a horizontal transition in the baseband television signal as by measuring its magnitude and spectral slope, developing a control signal from the detected horizontal transition which is related in duration to the horizontal transition, applying the control signal smoothly and adaptively to modify the structure of a low pass filter structure during the duration of the control signal to minimize ringing response of the structure.

14 Claims, 3 Drawing Sheets

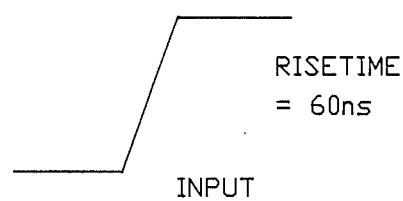
FIG.-5A  RISETIME = 60ns  INPUT
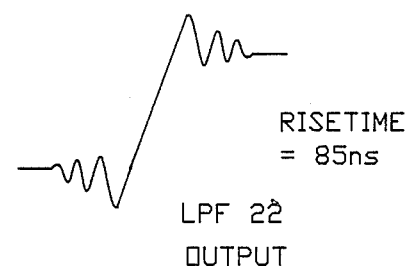
FIG.-5B  RISETIME = 85ns  LPF 22 OUTPUT
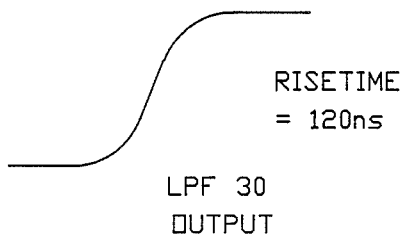
FIG.-5C  RISETIME = 120ns  LPF 30 OUTPUT
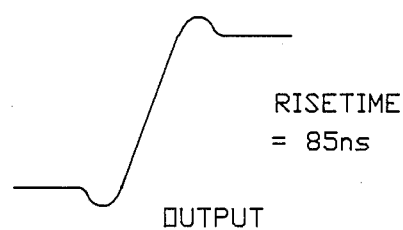
FIG.-5D  RISETIME = 85ns  OUTPUT

ADAPTIVE RINGING REDUCER FOR TELEVISION SIGNAL PROCESSING

FIELD OF THE INVENTION

The present invention relates to signal processing apparatus and methods for television video signals and systems. More particularly, the present invention relates to methods and apparatus for adaptively reducing unwanted ringing artifacts otherwise generated within a wideband television signal processing path.

BACKGROUND OF THE INVENTION

Under certain signal processing conditions within a video path, filters having very sharp or steep rolloff characteristics are employed. One typical application of such filters is at an input of an analog to digital conversion process within digital television signal processing apparatus, whether at the camera/origination end of the signal path, or at the receiver/display end thereof.

In accordance with the Nyquist sampling limit, digital sampling of an analog signal must be carried out at a frequency which is no less than twice the highest frequency component of the analog signal to be converted to digital format. Should a component be of higher frequency (or shorter transitional period) than the maximum high frequency permitted by the analog to digital conversion process, the digital samples will contain unwanted spectral foldback aliases which will be plainly visible in the displayed picture.

One approach followed by the prior art to eliminate spectral foldback aliases has been to position a "brick wall" low pass filter at an input to an analog to digital conversion process. Such a filter is typically implemented with as many as nine or more poles within analog circuitry or equivalent digital circuitry. A brick wall low pass filter typically provides a frequency response graphed in FIG. 4A herein. Brick wall low pass filters are typically very well phase equalized throughout the passband thereof; but, such filters are usually very susceptible to phase errors at the vicinity of the cutoff frequency. While brick wall low pass filters work very well for continuous, wideband video signal information, such as is exemplified by the multi-burst test signal, brick wall filters cause ringing in response to fast horizontal transitions which have a very wide and high frequency momentary energy distribution.

Gaussian low pass filters have a much more gradual and smooth rolloff characteristic and do not cause substantial ringing in response to a fast horizontal transition. However, since the rolloff is more gradual than with the brick wall characteristic, the rolloff frequency must start at a lower frequency in order to minimize spectral foldback aliases (some aliasing is typically present with Gaussian filters), and less high frequency energy will therefore be available to an analog to digital conversion process than if a brick wall filter is used. A lower resolution digital picture ensues with a Gaussian low pass filter. With multiple passes through a Gaussian type filter, each new generation image will be degraded from the prior generation. Such is not the case with brick wall filters.

Thus, a hitherto unsolved need has arisen for a method and apparatus which provides the benefits of brick wall filters without resultant visible ringing in response to sharp transitions or impulses.

SUMMARY OF THE INVENTION WITH OBJECTS

A general object of the present invention is to provide methods and apparatus for adaptively reducing unwanted ringing artifacts otherwise generated within a wideband television signal processing path in a manner which overcomes limitations and drawbacks of the prior art.

A more specific object of the present invention is to provide an adaptive low pass filtering method and apparatus which adaptively optimizes the characteristics of brick wall filters and Gaussian filters in response to signal conditions.

Another specific object of the present invention is to reduce ringing artifacts within a television signal process without reducing the bandwidth thereof.

A further specific object of the present invention is to improve signal response to multiple passes through low pass filters so that ringing is removed on the first pass and maximum bandwidth is achieved on second and subsequent passes.

These objects are realized in a method for reducing ringing artifacts caused by low pass filtering of baseband television signals, the method comprising the steps of:

detecting the occurrence of a fast horizontal transition in the baseband television signal, developing a control signal from the detected horizontal transition which is related in duration to the horizontal transition, applying the control signal to an adaptive low pass filter structure including a brick wall low pass filter to smoothly modify its characteristics during the duration of the control signal thereby to minimize the ringing response of the structure.

In one aspect of the present invention the step of modifying the low pass filter structure includes the step of applying the control signal to the adaptive low pass filter structure such that when there is a large and fast horizontal transition, the structure is optimized for minimum ringing response and when there are small or slow or no horizontal transitions, the filter structure is optimized for maximum bandwidth.

In another aspect of the present invention, the method step of detecting the occurrence of the horizontal transition and the step of developing the control signal comprise the steps of:

high pass filtering the baseband television signal such that there is little or no spectral overlap between the spectrum of a brick wall low pass filter through which the signal passes and the resultant high pass filtered component of each horizontal transition of the baseband television signal, eliminating the sign of the high pass filtered component, low pass filtering the high pass filtered component to generate the control signal, and stretching the control signal in time so that it has a duration greater than the duration of each horizontal transition. This last step may be followed by thresholding and limiting.

In a further aspect of the present invention, the method step of detecting the occurrence of the horizontal transition and the step of developing the control signal comprise the steps of:

developing a transition slope signal s representative of absolute value of the slope of the horizontal transition, shaping the slope signal with a shaper such that its characteristics are substantially output amplitude equals input amplitude when the slope signal s lies in a range from zero to unity, its characteristics are substantially 2-s when the slope signal s lies in a range from one to two, and its characteristics are substantially zero when the slope signal s is above two, developing a transition magnitude signal indicative of magnitude of the horizontal transition, and multiplying the shaped slope signal by a transition magnitude signal to produce the control signal.

In this immediately foregoing aspect the control signal may be subjected to stretching, thresholding and limiting before being applied to control the adaptive low pass filter structure. Also, in this aspect, the slope signal may be derived by band pass filtering a high frequency first spectral region of the baseband television signal, removing the sign and low pass filtering of the filtered first region; band pass filtering a high frequency second spectral region of the baseband television signal, removing the sign and low pass filtering the second region; dividing the low pass filtered second region signal by the low pass filtered first region signal and shaping the resultant quotient. Further, in this aspect, the transition magnitude signal may be derived by high pass filtering the baseband televison signal to include the first and second spectral regions to provide a high pass component, removing the sign of the high pass component and low pass filtering the high pass component.

These and other objects, aspects, advantages and features of the present invention may be more fully understood and appreciated by considering the following detailed description of a preferred embodiment, presented in conjunction with the accompanying drawing.

BRIEF DESCRIPTION OF THE DRAWINGS

In the Drawings:

FIGS. 5A, 5B, 5C and 5D are horizontal transition response graphs of the FIG. 2 and 3 circuit elements along a common frequency spectrum.

DETAILED DESCRIPTION OF PREFERRED EMBODIMENTS

Figure 1:
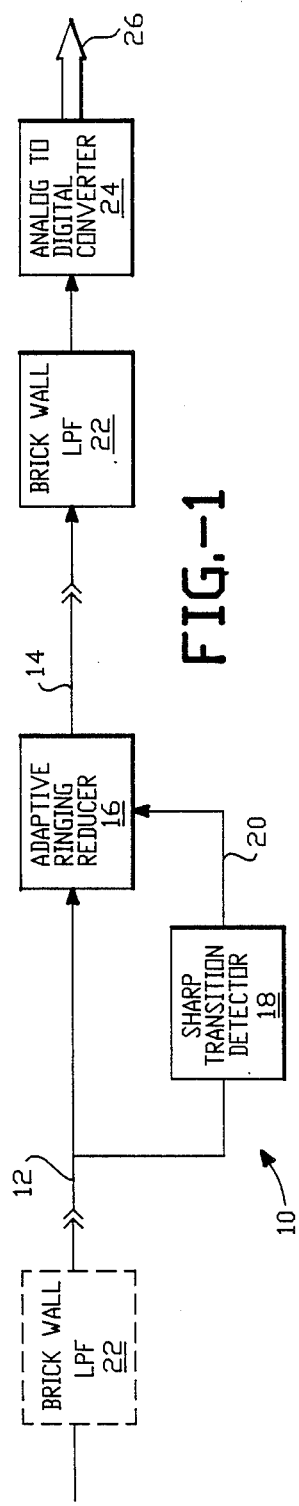
FIG. 1 is an overall block diagram of a baseband television video signal processing path including an adaptive ringing reducer and control in accordance with the principles of the present invention.

With reference to FIG. 1, a baseband television signal processing path includes apparatus 10 for adaptively reducing ringing artifacts. The path includes an input 12 and an output 14. The input includes a baseband video signal, which may be luminance, or a color component, such as red, green or blue. It may also be a color difference signal such as R-Y or B-Y. An adaptive ringing reducer circuit 16 is within the path between the input 12 and the output 14. A sharp transition detector circuit 18 develops a control signal from the baseband signal present on the input 12 and applies that control signal over a control line 20 to control operation of the ringing reducer circuit 16 as will be explained hereinafter in greater detail.

Figure 2:
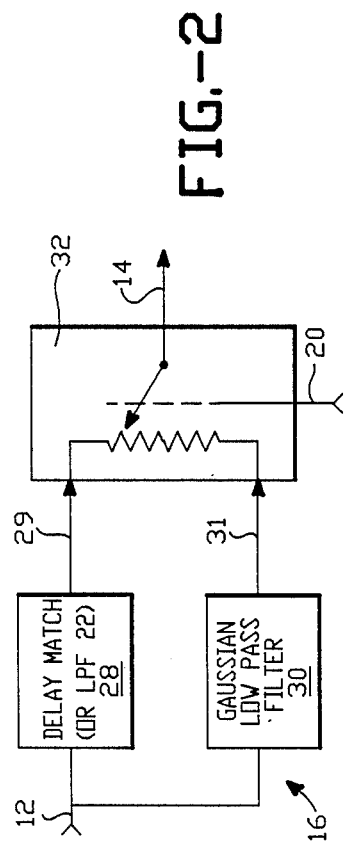
FIG. 2 is a more detailed block diagram of the adaptive ringing reducer element of the FIG. 1 processing path.

The path may further include a brick wall low pass filter 22 and an analog to digital converter 24 which converts analog samples of the baseband video in the path which have been passed by the ringing reducer circuit 16 as well as the brick wall filter 22. As is graphed in the FIG. 1 overall block diagram, the brick wall low pass filter 22 may follow the adaptive ringing reducer circuit 16, or it may precede the circuit 16 as suggested by the dashed outline block within the input path 12. When the brick wall filter 22 follows the adaptive ringing reducer circuit 16, the detector circuit 18 of FIG. 3, as well as the detector circuit 18A of FIG. 6, may be used to control the adaptive ringing reducer circuit 16. When the brick wall filter 22 precedes the adaptive ringing reducer circuit 16, the detector circuit 18A of FIG. 6 must be used. FIG. 2 depicts two preferred embodiments of adaptive ringing reducer circuit 16. In a first embodiment, the input 12 is connected in parallel to a delay match 28 and to a Gaussian low pass filter 30. An output 29 from the delay match and an output 31 from the filter 30 enter opposite ends of a linear fader circuit 32 which may be implemented as a solid state "soft" switch in accordance with well known techniques. A central pole of the fader 32 is controlled by the control signal on the line 20 and leads directly to the output line 14. In this embodiment, when there is no detected high frequency energy at the sharp transition detector 18, the output 14 remains in direct connection with the delay match 28, and the output path 14 leads directly from the input path 12 to the brick wall filter 22 without modification.

The control signal on the line 20 ranges in value from zero to unity in relation to at least one of the magnitude and slope of the sharp horizontal transition detected by the transition detector 18. The greater the magnitude or slope, or both, the greater will be the control value within the zero to unity range.

A second embodiment of adaptive ringing reducer 16 includes the brick wall low pass filter 22 in lieu of the delay match 28. In this embodiment, the brick wall filter 22 depicted in FIG. 1 is actually included within the ringing reducer 16. This embodiment requires the control circuit 18A which develops the control signal on the line 20 from both magnitude and slope values of the baseband horizontal transition.

Figure 3:
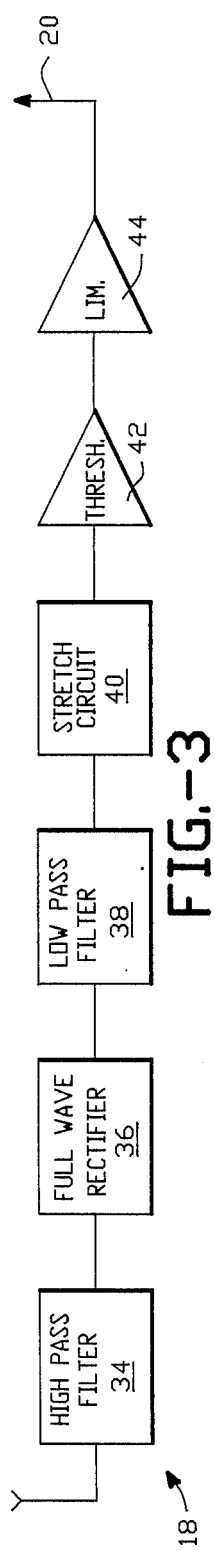
FIG. 3 is a more detailed block diagram of one embodiment of the control element of the FIG.1 processing path.

With reference to FIG. 3, a first embodiment of sharp transition detector 18 is depicted. Therein, the baseband video input 12 is connected to a high pass filter 34 which has a passband almost entirely above the passband of the brick wall low pass filter 22 with very little if any spectral overlap between the filters 34 and 22. A full wave rectifier 36 removes the sign (direction) of the transition energy, and a low pass filter removes high frequency artifacts and noise, so that the resultant control signal is robust and truly representative of the magnitude of the horizontal transition.

The control signal is then stretched in time by a conventional pulse stretching circuit 40 which extends the duration thereof by e.g. 100 nanoseconds before and after the beginning and end of the corresponding horizontal domain transition. The stretched control signal is thereupon subjected to a threshold within a threshold amplifier 42. Since only sharp horizontal transitions having a transition amplitude of about 10-15 IRE units result in visible ringing within a brick wall filter, the threshold circuit 42 only puts out the control signal when its amplitude incoming to the circuit 42 is at or above the threshold level, such as 10-15 IRE units. The output from the threshold circuit 42 enters a limiter amplifier 44 which limits the output to unity when the input reaches and exceeds about 30-40 IRE units. Between the 10-15 IRE threshold and the 30-40 IRE unit limit, the control signal varies linearly from zero to unity.

Figure 4A:
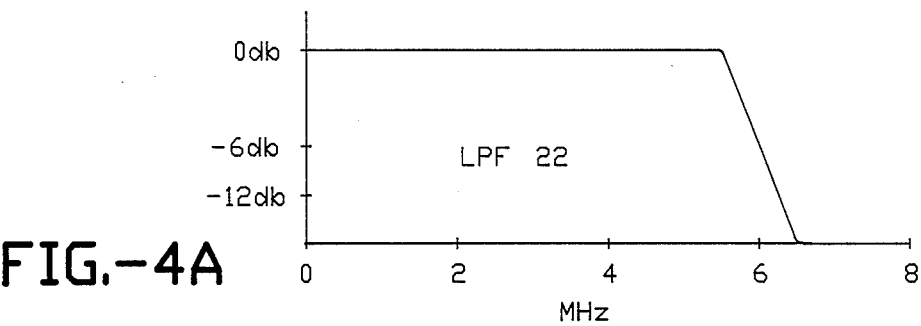
FIGS. 4A, 4B, 4C and 4D are spectral response graphs of elements of the FIGS. 2 and 3 circuit elements, along a common frequency spectrum.
Figure 4B:
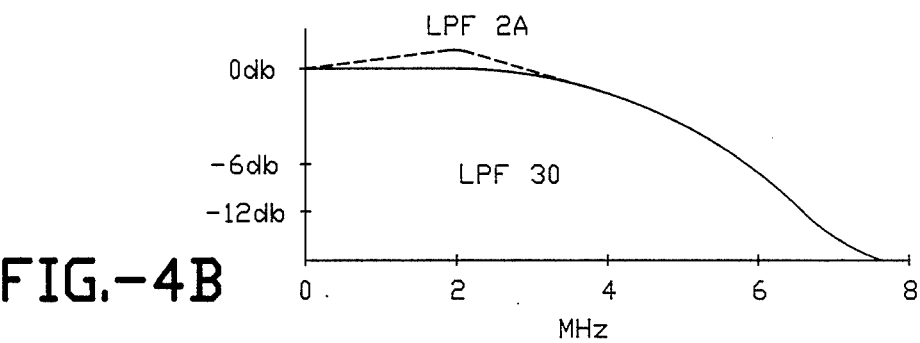

FIG. 4A graphs the typical passband response of a brickwall low pass filter, such as the filter 22 when employed to filter baseband video. FIG. 4B graphs typical passband response of a Gaussian type low pass filter, such as the filter 30, for filtering the baseband video signal. The filter characteristic may be modified slightly as shown by the dashed lines in FIG. 4B in order to provide the same rise time as is provided by the brick wall low pass filter 22. By Gaussian type low pass filter is meant any low pass filter structure which has a response similar to or approximating the fall-off portion of the well-known Gaussian filter response given by $$|H(jw)| = exp[-0.3466(w/w_c)^2],$$

wherein
$w_c$ = 3db frequency.
The filter does not have to be precisely Gaussian in structure or function.

Figure 4C:
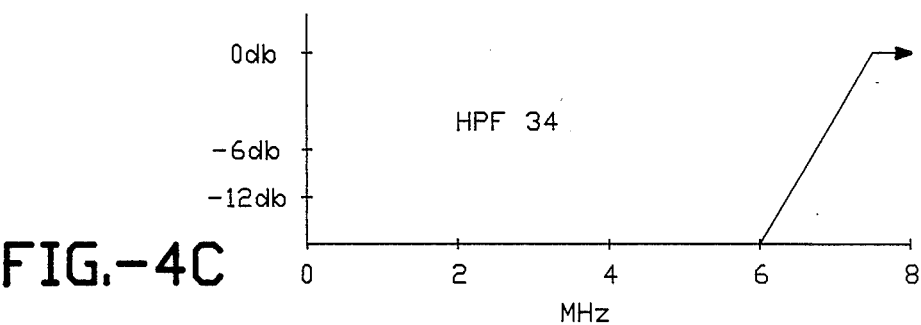

FIG. 4C graphs the passband response of the high pass filter 34 of the FIG. 3. As can be seen in comparison with the characteristic graphed in FIG. 4A for the brick wall low pass filter 22, there is essentially no spectral overlap between the passbands of the brick wall filter 22 and the high pass filter 34.

Figure 4D:
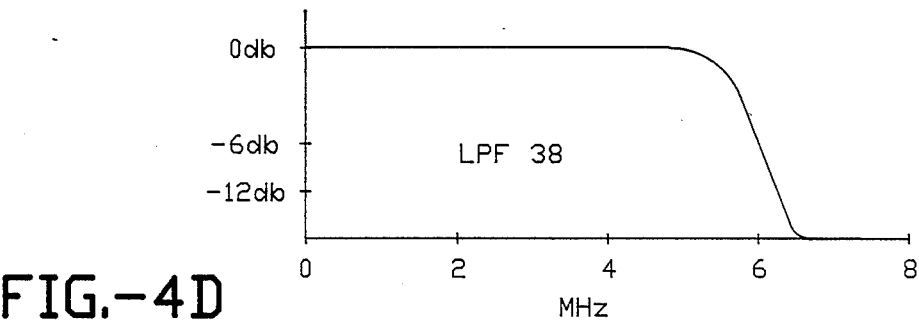

FIG. 4D graphs the passband response of the low pass filter 38 within the sharp transition detector 18. Its 6 db rolloff point is at approximately 6 MHz.

FIG. 5A graphs typical 60 nanosecond rise time of a sharp horizontal transition on the input line 12. FIG. 5B graphs the response of the brick wall filter 22 to the 60 nanosecond rise time transition. This response is characterized by ringing before and after the resultant 85 nanosecond transition. FIG. 5C graphs the response of the Gaussian type low pass filter 30 to the FIG. 5A transition. Note the absense of ringing but the sluggishness of the resultant transition (120 nanoseconds duration). FIG. 5D illustrates the output of the adaptive ringing reducer circuit 14 and the brick wall low pass filter circuit 22. Slight preshoot and overshoot accompany the 85 nanosecond transition, but there is no higher order ringing, and there will be no visible ringing artifacts in the resultant display of the baseband video signal.

As has been demonstrated by the foregoing description, I have developed a low pass filtering scheme which incorporates the advantages of both brick wall and Gaussian type low pass filters. My approach involves real time adaptive switching between the brick wall low pass filter and the Gaussian type filter. The control signal performing the switching (or weighting) is formed by sending the baseband video into a network consisting of a high pass filter, double rectifier and low pass filter. If there are significant high frequencies out of the baseband, as is the case of a large and fast black level to white level video transition, the Gaussian filter is linearly switched into the circuit. This method thereby eliminates ringing that otherwise normally accompanies a brick wall filter. Multiple pass video processing will only trigger the Gaussian filter on the first pass, with the brick wall filter remaining in place for second and subsequent passes.

Figure 6:
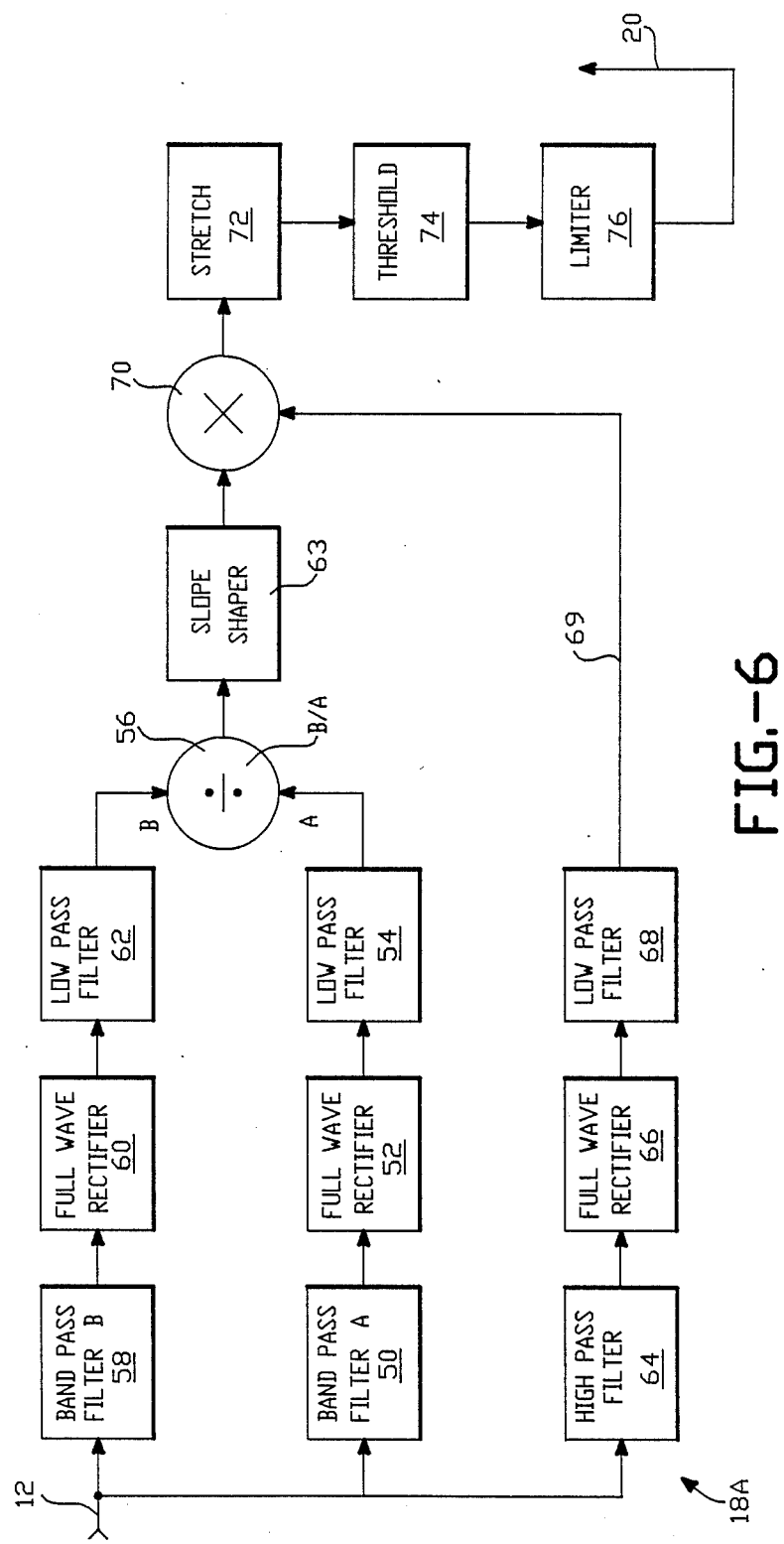
FIG. 6 is a block diagram of an alternative embodiment of the control circuit of the FIG. 1 processing path.

FIG. 6 shows an alternative preferred embodiment of sharp transition detector 18A. The input 12 is connected to bandpass filter A 50 which has a pass band centered within the baseband spectrum, such as 2.5 MHz, for example. The bandpass spectrum is full wave rectified by a rectifier 52 to remove transition direction or sign and is low pass filtered by a filter 54 to remove any sharp edges and high frequency components above, e.g. about 4 MHz.

Figure 7A:
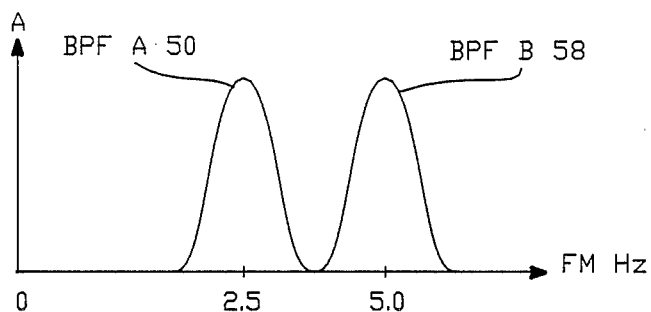
FIGS. 7A and 7B are spectral response graphs of elements of the FIG. 6 control circuit along a common frequency spectrum; and, FIGS. 7C and 7D are spectral energy plots respectively of a slow horizontal transition and a fast horizontal transition.

The input 12 is also connected to bandpass filter B 58 which has a pass band centered within the baseband spectrum such as about 5 MHz, for example. The center of the bandpass of the filter 58 is separated spectrally from the center of the bandpass of the filter 50. The spectral characteristics of the filters 50 and 58 are plotted in an energy plot of FIG. 7A.

The output from the filter 58 is full wave rectified by a rectifier 60 and low pass filtered by a filter 62 which rolls off components above about 8 MHz. The low pass filtered outputs of the filters 54 and 62 are divided within a ratio circuit 56 to develop a fractional value which is indicative of the spectral slope of the transition. This ratio or slope value provides one component of the control signal which will ultimately control the soft switch 32.

A slope shaper circuit 63 receives and shapes the quotient put out by the ratio circuit 56 such that the quotient is unaffected when it lies in a range from zero to unity amplitude. When the incoming quotient is above unity and below two, the shaper linearly reduces the quotient by a function of two minus the quotient. When the incoming quotient is above two, the output of the shaper is zero. Thus, the shaper precludes a quotient when the A value from the low pass filter 54 is low in amplitude whereas the B value from the low pass filter 62 is large. This situation could easily obtain if a sine wave (steady state signal as opposed to a transition) were present at the passband of the filter 58 but not at the filter 50.

Figure 7B:
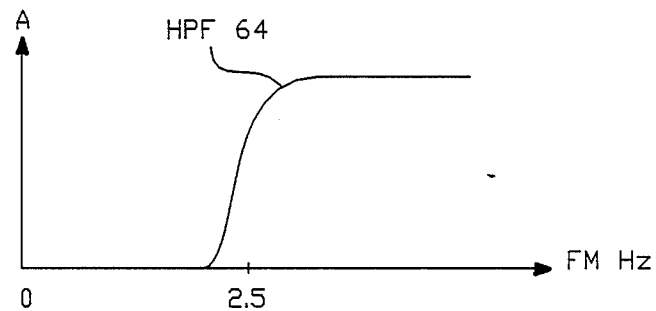

The magnitude of the horizontal domain transition is developed by a connection of the input 12 to a high pass filter 64 which passes the baseband input energy above about 2.5 MHz in accordance with the characteristic graphed in FIG. 7B. This energy is full wave rectified in a rectifier 66 to remove sign of the transition and is then low pass filtered in a filter 68 to remove resultant energy above about 6 MHz. The resultant signal, on a line 69, corresponds in amplitude to horizontal transition magnitude.

The transition slope value put out from the slope shaper circuit 63 is multiplied in a multiplier circuit 70 by the transition magnitude value output on the line 69 from the filter 68. The resultant control value is then subjected to time stretching in a conventional stretch circuit 72, thresholding in a threshold amplifier 74, and limiting in a limiter amplifier 76. The circuits 72, 74 and 76 have the same functional characteristics as ascribed hereinbefore to the elements 40, 42 and 44. The resultant control signal, indicative of both magnitude and slope of the sharp horizontal transition, is applied over the line 20 to control the proportional switch 32.

Figure 7C:
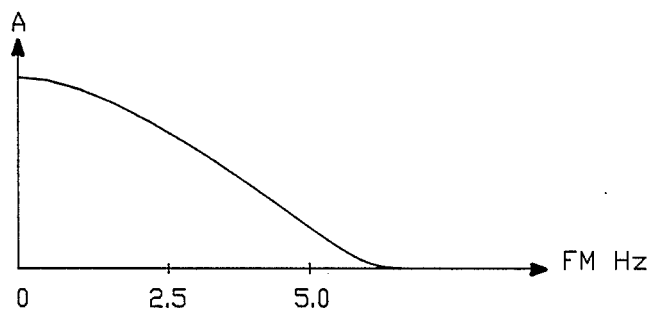
Figure 7D:
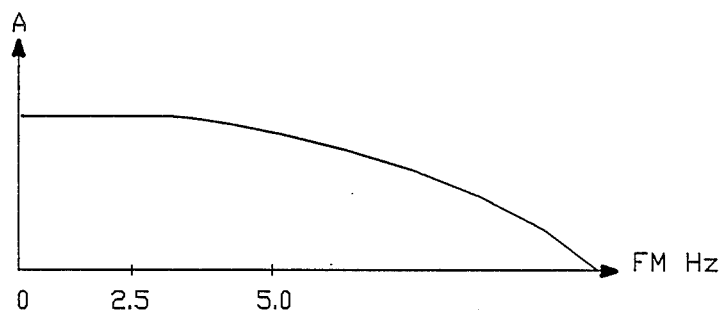

FIG. 7C graphs spectral energy distribution of a slow transition, while FIG. 7D graphs spectral energy of a fast transition. In the case of the FIG. 7C slow transition, the slope will be about one to three or four. In the case of the FIG. 7D fast transition, the slope will be nearly unity.

I have observed that first order ringing or preshoot and overshoot is much less visually disturbing than second, third ... nth order ringing. Taking this observation into account, a second possible modified Gaussian filter response having risetimes almost equal to the brick wall filter (as graphed in dashed lines in FIG. 4B) is entirely feasible and works well in place of the original Gaussian low pass filter (graphed in solid line in FIG. 4B). Using the modified Gaussian low pass filter will result in a visual display effect of little or no degradation of picture sharpness even when the Gaussian filter 30 is switched in.

Having thus described presently preferred embodiments of the present invention, it will now be appreciated that the objects of the invention have been fully achieved, and it will be understood by those skilled in the art that many changes in construction and widely varying embodiments, techniques and applications of the invention will suggest themselves without departure from the spirit and scope of the present invention. The disclosures and the description herein are therefore purely illustrative and are not intended to be in any sense limiting.

I claim:

1. A method for reducing ringing artifacts caused by low pass filtering of a baseband television signal, the method comprising the steps of:
    detecting the occurrence of a horizontal transition in the baseband television signal,
    developing a control signal from the detected occurrence of the horizontal transition,
    applying the control signal to an adaptive low pass filter structure smoothly to modify its characteristics during the duration of the control signal to minimize ringing response of the structure.

2. The method set forth in claim 1 wherein the step of applying the control signal to modify the characteristics of the low pass filter structure includes the step of applying the control signal to the adaptive low pass filter structure such that when there is a horizontal transition having both a large magnitude and a shallow spectral slope, the filter structure is optimized for minimum ringing response; and, when at least one of the following conditions are present: a horizontal transition having a low magnitude, a steep spectral slope, and no horizontal transitions, the filter structure is optimized for maximum bandwidth.

3. The method set forth in claim 1 wherein the step of detecting the occurrence of the horizontal transition and the step of developing the control signal comprise the steps of:
    high pass filtering the baseband television signal such that there is little or no spectral overlap between the spectrum of the adaptive low pass filter structure and the resultant high pass filtered component of each horizontal transition of the baseband television signal,
    eliminating the sign of the high pass filtered component,
    low pass filtering the high pass filtered component to generate the control signal, and
    stretching the control signal in time so that it has a duration greater than the duration of each horizontal transition.

4. The method set forth in claim 3 comprising the further step of subjecting the control signal to a predetermined minimum amplitude threshold.

5. The method set forth in claim 4 wherein the threshold lies in a range between 10 and 15 IRE units.

6. The method set forth in claim 3 comprising the further step of subjecting the control signal to a predetermined maximum amplitude limit.

7. The method set forth in claim 6 wherein the limit lies in a range between 30 and 40 IRE units.

8. The method set forth in claim 1 wherein the step of detecting the occurrence of the horizontal transition and the step of developing the control signal comprise the steps of:
    developing a slope signal representative of absolute value of the slope of the horizontal transition,
    shaping the slope signal in accordance with a predetermined shaping characteristic which varies with incoming amplitude of the slope signal,
    developing a magnitude signal representative of absolute magnitude of the horizontal transition,
    multiplying the shaped slope signal by the transition magnitude signal to produce the control signal.

9. The method set forth in claim 8 wherein the step of shaping the slope signal comprises multiplying the slope signal by unity when its incoming magnitude lies in a range from zero to unity, and subtracting its incoming magnitude from two in the range of one to two and equating it with zero when its incoming magnitude is equal to or in excess of two.

10. The method set forth in claim 8 further comprising the steps of stretching, thresholding and limiting the control signal in accordance with a predetermined stretch time, minimum threshold level and maximum amplitude limit.

11. The method set forth in claim 8 wherein the step of developing the slope signal is carried out by the steps of band pass filtering a high frequency first spectral region of the baseband television signal, removing the sign and low pass filtering of the filtered first region; band pass filtering a high frequency second spectral region of the baseband television signal, removing the sign and low pass filtering the second region; and, dividing the low pass filtered second region signal by the low pass filtered first region signal to produce the slope signal.

12. The method set forth in claim 8 wherein the step of developing the transition magnitude signal is carried out by the steps of high pass filtering the baseband televison signal to include the first and second spectral regions to provide a high pass component, removing the sign of the high pass component and low pass filtering the high pass component.

13. The method set forth in claim 1 wherein the step of applying the control signal to an adaptive low pass filter structure smoothly to modify its characteristics during the duration of the control signal to minimize ringing response of the structure comprises the step of adding a Gaussian type low pass filter to the structure during the duration of the horizontal transition.

14. The method set forth in claim 12 wherein the step of applying the control signal to an adaptive low pass filter structure comprises the steps of smoothly switching in the Gaussian type low pass filter to the filter structure in relation to the magnitude of the control signal.

* * * * *